United States Patent
Smith et al.

(10) Patent No.: US 7,594,106 B2
(45) Date of Patent: Sep. 22, 2009

(54) METHOD AND APPARATUS FOR DEVICE DETECTION AND MULTI-MODE SECURITY IN A CONTROL NETWORK

(75) Inventors: Eric Smith, Lindon, UT (US); James Gist, Draper, UT (US)

(73) Assignee: Control4 Corporation, Draper, UT (US)

( * ) Notice: Subject to any disclaimer, the term of this patent is extended or adjusted under 35 U.S.C. 154(b) by 544 days.

(21) Appl. No.: 11/046,519

(22) Filed: Jan. 28, 2005

(65) Prior Publication Data
US 2006/0174102 A1 Aug. 3, 2006

(51) Int. Cl.
*H04L 29/06* (2006.01)
(52) U.S. Cl. ...................... 713/150; 713/153
(58) Field of Classification Search ................. 713/153, 713/150
See application file for complete search history.

(56) References Cited

U.S. PATENT DOCUMENTS

| | | | |
|---|---|---|---|
| 6,170,057 B1* | 1/2001 | Inoue et al. | 713/153 |
| 6,574,234 B1 | 6/2003 | Myer et al. | |
| 6,615,088 B1* | 9/2003 | Myer et al. | 700/20 |
| 7,069,585 B1* | 6/2006 | Chess et al. | 726/9 |
| 2005/0120216 A1* | 6/2005 | Lee et al. | 713/171 |
| 2005/0120246 A1* | 6/2005 | Jang et al. | 713/201 |

OTHER PUBLICATIONS

Echelon Corporation, LonWork "Building Automation Technology Review", 2003, pp. 1-8.

* cited by examiner

*Primary Examiner*—Kambiz Zand
*Assistant Examiner*—Amare Tabor
(74) *Attorney, Agent, or Firm*—The Hecker Law Group, PLC

(57) ABSTRACT

A method and apparatus for device discovery and multi-mode security in a wired and/or wireless control network are described. A controlled device is configured with discovery-level instructions and application-level control instructions. The controlled device includes a user-configurable parameter for selecting between multiple security modes. In one or more security modes, the controlled device may ignore application-level messages until encrypted communications are established with a controller. In one mode, the encrypted communication is established with an encryption key exchange using a predetermined security key. In another mode, a specific key is manually entered into the controller by the user/administrator to facilitate the encryption key exchange. Additionally, for control applications where security is not important, an unencrypted security mode may be implemented. A driver ID provided by the controlled device facilitates loading of a preferred device driver by the controller.

28 Claims, 8 Drawing Sheets

METHOD AND APPARATUS FOR DEVICE DETECTION AND MULTI-MODE SECURITY IN A CONTROL NETWORK

FIELD OF THE INVENTION

The invention relates to the field of device networking, and more specifically, to device detection and security in a wired and/or wireless control network.

A portion of the disclosure of this patent document contains material which is subject to copyright protection. The copyright owner has no objection to the facsimile reproduction by anyone of the patent document or the patent disclosure, as it appears in the Patent and Trademark Office file or records, but otherwise reserves all copyrights associated with this document.

BACKGROUND

A modern home includes many appliances and devices intended to provide comfort and convenience to the residents. For example, a home may include lighting equipment; security equipment; entertainment equipment; and heating, ventilation, and cooling (HVAC) equipment. However, most of this equipment has been developed separately and has separate and incompatible user interfaces and controls. To set the equipment to the user's desired settings, users must learn to use many different types of controls and may have to move back and forth between controls located at different locations throughout the house to achieve the desired result. A system is needed to provide a common interface to control a wide variety of equipment from one or more convenient locations.

There are many examples of inconveniences caused by separate and incompatible user interfaces. For example, each lamp usually has its own separate switch that must be operated to control the lamp. A television set may be equipped with a remote control, but that remote control might not be compatible with a remote control for a videocassette recorder. A sound system might require different remote controls for an amplifier and a compact disc player. A thermostat may be mounted at a single fixed location and require going to that location whenever an adjustment is desired. Thus, much effort is required to control devices having separate and incompatible user interfaces.

Various attempts have been made to overcome such inconveniences. For example, so-called universal infrared remote controls were developed to allow control of multiple audio-visual devices using a single infrared-emitting control. However, such a remote control does not control lights; heating, ventilation, and air conditioning equipment (HVAC), telephone lines, relay-controlled devices, devices with electrical serial data ports, or other devices. Moreover, such a remote control is not responsive to input from other devices, for example, devices emitting infrared signals. Also, an optical path must exist between such a remote control and an audio-visual device to be controlled since the infrared signal cannot penetrate walls or floors. Thus, infrared remote controls are ineffective for home automation.

Another attempted solution is referred to as the X-10 system. The X-10 system is a power line carrier communication system that superimposes a higher-frequency (i.e., 120 KHz) amplitude shift keyed (ASK) carrier over the 60 Hz power line frequency. X-10 devices are plugged into electrical outlets within a building. Sixteen X-10 commands are available to control X-10 devices. However, most X-10 devices recognize a subset of seven commands. X-10 devices are addressable using a four-bit "house" code designated by the letters A-P and a four-bit "unit" code designated by the numbers 1-16.

Since the X-10 system relies on a power line carrier, the performance of an X-10 system may be degraded by power line noise. Since pre-existing wiring in buildings was generally not specifically intended to be used with an X-10 system, the wiring topology of a building is often unknown, especially for older structures. Attenuation of power line carrier signals on a power line network is variable and often unpredictable, affecting the reliability of power line carrier transmission. Other power line carrier transmission techniques may interfere with X-10 signals. Because of the limited carrier frequency, the data transmission rates are slow, limiting use to situations where response time is not critical and where high data throughput is not important. At least one transmitter and a separate receiver for each controlled circuit are needed. Some X-10 devices have problems with data collisions during simultaneous transmissions. Thus, the X-10 system is of limited utility for home automation.

One type of system for providing control over network devices is known as the CEBus system. The CEBus system requires a network having distributed processing capability (i.e., an intelligent network). One of the problems associated with intelligent networks is that they are difficult to update with new information or configurations since intelligent nodes across the network must be updated, usually simultaneously. Updated information cannot simply be loaded into a single controller that controls the entire network. Each node of an intelligent network must be programmed to anticipate all possible combinations of node interaction within the network. Thus, if a new type of device for which the intelligent nodes are not programmed is introduced into the network, the intelligent nodes must be reprogrammed to be able to accommodate the new type of device as well as its range of possible interactions with other nodes on the network. Thus, networks having distributed processing capability generally require more maintenance and are more difficult to set up than master-slave based networks.

Another type of system for providing control over network devices is known as the Echelon LonWorks system. The Echelon system uses nodes that may operate in either a peer-to-peer mode (providing distributed control) or a master-slave mode (utilizing centralized control). Since the nodes possess computational capabilities, processing functions may be distributed throughout the system. Although the Echelon system may use existing electric power distribution wiring for communications, separate wiring is usually installed specifically to allow the Echelon nodes to communicate. When used in the peer-to-peer mode, the Echelon system also suffers the disadvantages associated with networks having distributed processing capabilities. Unfortunately, the peer-to-peer mode has been specified for use when interoperability of Echelon devices is desired. Some of the problems that can occur with the peer-to-peer mode include difficult setup, an increased processing power requirement at each node, and incompatibility of devices with future devices.

U.S. Pat. No. 6,574,234 (the '234 patent) discloses a method and apparatus for controlling devices on a network, such as household devices on a home automation network. In the disclosed system, a home automation network utilizes a central controller that provides control over one or more devices connected to the network. The central controller may be coupled to a computer, allowing the computer to program the central controller and to act as a redundant controller in case the central controller fails or is otherwise unable to effectively control the network. The central controller may communicate with devices and other equipment over a variety of types of networks, including EIA-485 balanced cabling and ethernet networks.

The '234 patent describes an identification mode that allows identification of devices and binding of physical devices to their corresponding representations used by the controller. The actual physical devices are referred to as hardware objects, while the representations used by the controller to represent the hardware objects are referred to as software objects. When a software object is being defined or selected, any hardware objects that are not already bound to a software object may be placed in an identification mode. In the identification mode, the unbound hardware objects provide an indication that they are unbound. A hardware object to be bound to the software object can then be easily selected from the unbound hardware objects.

Each of the foregoing systems suffers from limitations imposed by the communication medium. Power line-based communications are subject to interference and limited to outlet locations. Other line-based solutions require the provision of extra wiring to support the control network, limiting the flexibility of the control configuration (e.g., to add a new device, a new wire must also be added). The IR approach has line-of-sight limitations that prevent its effective use beyond the confines of a single room. The present inventors have identified that it would be desirable to have a control network that is not subject to such transmission media limitations, i.e., a control network that provides the flexibility to add, subtract and relocate control devices (or nodes) without changing the existing transmission infrastructure.

Another limitation on the flexibility of some existing control systems is the manner in which the controller interfaces with the vast array of appliance types possible. Typically, the control functionality is either implemented over a uniform interface, regardless of appliance type, or the controller uses a particular software object or device driver to interface with each appliance type. In the former case, control functionality is limited by the generic control instruction set used for every application. In the latter case, the controller or the system administrator (e.g., the homeowner) is typically required to identify an appropriate software object or device driver for controlling each new control device or node. The present inventors have identified that it would be desirable for the selection of a suitable device driver or software object to be automated when a new appliance control device is added to the control network.

SUMMARY OF THE INVENTION

The invention provides a method and apparatus for device discovery and multi-mode security in a wired and/or wireless control network. In one or more embodiments of the invention, a controlled device is configured with a system-level set of instructions and an application level set of instructions. The system level instructions may provide support for basic communications between the controlled device and the controller, e.g., for purposes of device discovery and identification. The application level instructions may provide support for the communication of application level messages between the controller and the controlled device, e.g., to access particular appliance control functions implemented by the given controlled device.

One or more embodiments of the invention implement a device discovery protocol in which the controlled device transmits an identifier of a preferred device driver to the controller, e.g., in response to a discovery request broadcast from the controller or as part of an announcement message when the controlled device is activated (e.g., turned "on"). The controller may use the device driver identifier to load an appropriate device driver for supporting application-level communications with the controlled device.

In one or more embodiments of the invention, the controlled device is equipped with a user-configurable parameter for selecting between multiple security modes. For example, in one or more security modes, the controlled device may require that encrypted communications be established with a controller before the controlled device will respond to any application level messages (e.g., unencrypted application level messages are dropped).

In one such mode, the encrypted communication may be established with an initial unsecured or minimally secured encryption key exchange. The initial key exchange represents a brief window of insecurity before fully encrypted communications are established between the controller and the controlled device. In one or more embodiments, the initial key exchange may be provided with a moderate level of security by encrypting the key exchange itself using a predetermined security key.

In another security mode, the initial key exchange may be protected more rigorously, in that the controlled device may require that a specific key be manually entered into the controller by the user/administrator to facilitate the encryption key exchange. Additionally, for control applications where security is not important, a security mode may be implemented that requires no encryption (e.g., application level communications are unrestricted).

In some embodiments, to prevent remote reconfiguration of the security mode, the security mode parameter may be implemented as a manually configurable hardware element associated with the controlled device. In some embodiments, the key that is manually entered into the controller may be presented, for example, on the housing of the controlled device, such that a user/administrator can personally obtain the key for entry into the controller.

DETAILED DESCRIPTION

Figure 1:
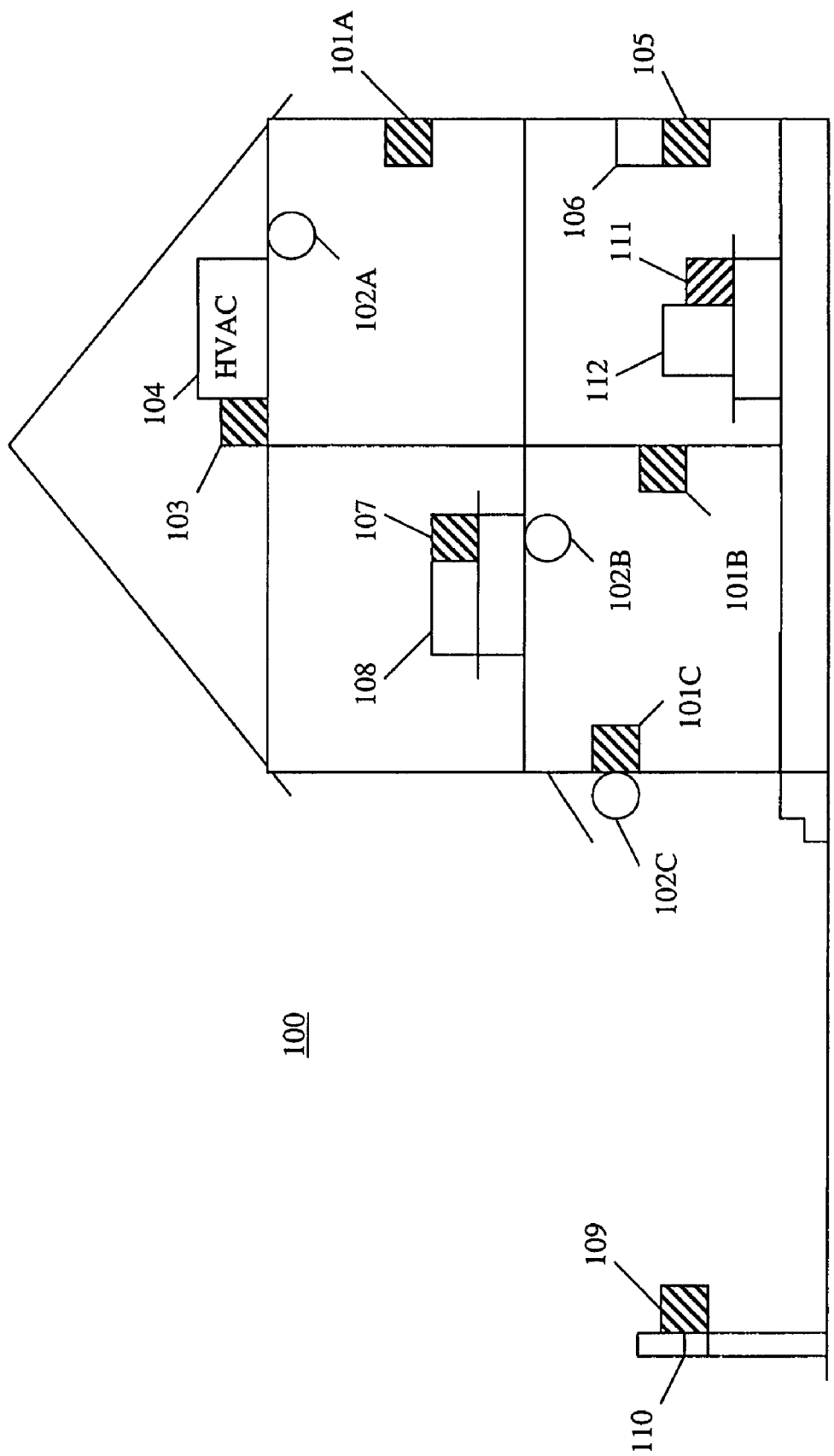
FIG. 1 is an illustration of a sample home control network environment.

The present invention provides device detection and multimode security for a wired and/or wireless control network. In the following description, numerous specific details are set forth to provide a more thorough description of the invention. It will be apparent, however, to one skilled in the art, that the invention may be practiced without these specific details. In other instances, well known features have not been described in detail so as not to obscure the invention.

In the preferred embodiment of the present invention, the control network is implemented as a wireless network, for example, using transmission frequencies that will pass through the structure of the common home without undue attenuation, and using a signal strength that localizes the transmission to the immediate vicinity of the home. The present invention also contemplates the use of such a control network in any other environment where centralized control of appliances is desired, such as in a business environment. Though the preferred embodiment of the invention is a wireless control network, it will be apparent that the concepts of the invention may also be used to enhance the performance of wired and hybrid (i.e., having both wired and wireless components) control networks as well.

In one or more embodiments of the invention, a controlled device is configured with a system-level set of instructions and an application-level set of instructions. The system level instructions may provide support for basic communications between the controlled device and the controller, e.g., for purposes of device discovery and identification. The application level instructions may provide support for the communication of application level messages between the controller and the controlled device, e.g., to access particular appliance control functions implemented by the given controlled device.

One or more embodiments of the invention implement a device discovery protocol in which the controlled device transmits an identifier of a preferred device driver to the controller, e.g., in response to a discovery request broadcast from the controller or as part of an announcement message when the controlled device is activated (e.g., turned "on"). The controller may use the device driver identifier to load a suitable device driver for supporting application-level communications with the controlled device. Because the controlled device specifies a preferred device driver during discovery, the controller is able to locate a suitable device driver with less computational effort than systems of the prior art, and with greater assurance that the full control functionality of the controlled device will be realized.

In one embodiment of the invention, the controlled device is equipped with a user-configurable parameter for selecting between multiple security modes. For example, in one or more security modes, the controlled device may require that encrypted communications be established with a controller before the controlled device will respond to application level messages (e.g., unencrypted application level messages are dropped). In one such mode, the encrypted communication may be established with an encryption key exchange using a predetermined security key. In another such mode, the controlled device may require that a specific key be manually entered into the controller by the user/administrator to facilitate the encryption key exchange. Additionally, for control applications where security is not important, a security mode may be implemented that requires no encryption (e.g., application level communications are unrestricted).

Example Control Network for Home Appliances

FIG. 1 is a diagram of an example control network for a modern home. Home environment 100 includes controlled devices 101A-101C coupled to respective light fixtures 102A-102C, controlled device 103 coupled to AC/heating unit 104, controlled device 105 coupled to alarm system 106, controlled device 107 coupled to audio system 108, and controlled device 109 coupled to gate lock 110. A controller 111 is coupled to personal computer 112.

Controlled devices 101A-101C may be used to provide automated control of lighting within the house (102A and 102B), as well as a porch light or other external lighting (102C). Controller 111 may send messages to controlled devices 101A-101C to turn on/off the lights on a timed schedule, in response to triggering of alarm system 106, or in response to a remote command from the homeowner (e.g., received via another controlled device, directly via controller 111, or via a web-based request received by personal computer 112).

Controlled device 103 may be used to provide automated and centralized control of the temperature within the home. For example, controller 111 may send messages to controlled device 103 to turn on/off the AC/heating system 104 in accordance with a timing schedule or a remote command, or to adjust the thermostat parameters according to some program. Feedback from alarm system 106, indicating an open door or window, may be used by controller 111 to trigger shutdown of AC/heating system 104.

Gate lock 110 and/or other security features of the house may be controlled via controlled device 109 and controller 111 to provide a central mechanism for locking down the house at night, in response to an alarm trigger from alarm system 106, etc. Further, the state of gate lock 110 may be communicated back to controller 111 via controlled device 109, e.g., to trigger the lights 102A-102C, AC/heating system 104 and audio system 108 to provide a welcoming atmosphere when the occupant unlocks the gate to go into the house.

As is clear from the above example, controller 111 and controlled devices 101A-101C, 103, 105, 107 and 109, facilitate the creation of an intelligent system within which a homeowner can obtain integrated and complementary behavior from various distinct appliances. The same approach can be used in businesses to cut energy costs, provide centralized and automated security, etc.

The control system of FIG. 1 may be configured with wired and/or wired components. With wireless components, because communication is not restricted to wired channels, new controlled devices may be added and existing controlled devices may be relocated without concern for infrastructure (apart from signal range). Control systems may also support mobile appliances or sensors within a wireless controller's signal range (or within an intermediary wireless controlled device's signal range).

However, because wireless transmissions are not confined to shielded channels, there is a risk that an interloper with wireless capability will attempt to usurp control of sensitive portions of the control network (e.g., to disable alarms, and unlock entrypoints, or to otherwise maliciously disrupt normal control functions). For example, a thief might operate a wireless device from a car parked near a residence, with the intent of disabling home security measures to facilitate a burglary of the residence. For these reasons, one or more embodiments of the present invention provide for enhanced control system security that is configurable at the level of the individual controlled device.

Example Embodiment of Controller and Controlled Device

Figure 2:
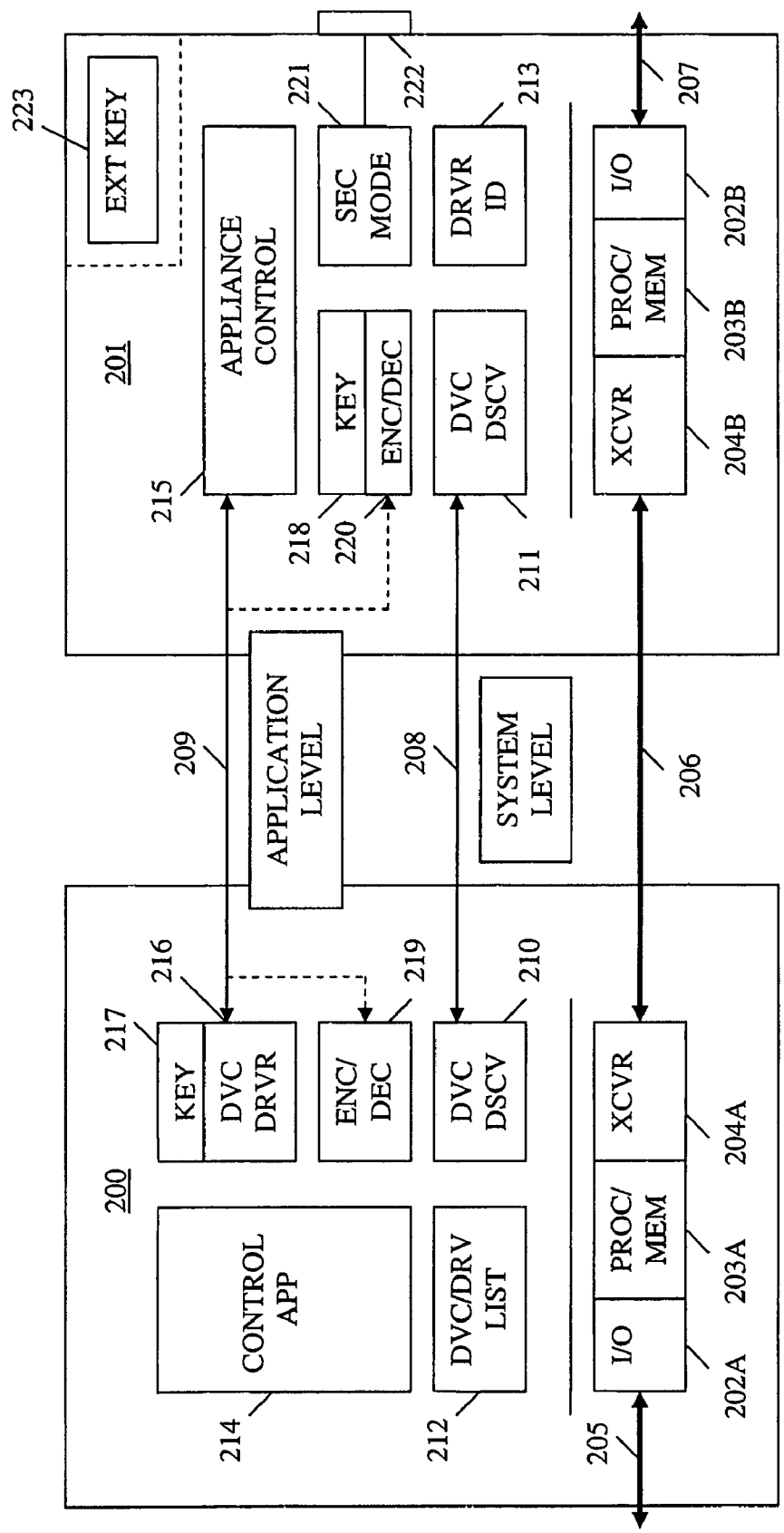
FIG. 2 is a block diagram of a controller and a controlled device, in accordance with one or more embodiments of the invention.

FIG. 2 is a block diagram of a controller and a controlled device, in accordance with one or more embodiments of the invention. Controller 200 includes hardware elements such as an I/O interface circuit 202A, an execution circuit 203A comprising a processor and memory, and a wireless transceiver (XCVR) circuit 204A. I/O circuit 202A may be used, for example, to interface with a personal computer across port 205. Transceiver 204A provides the wired or wireless channel 206 with a corresponding transceiver circuit 204B in one or more controlled devices (e.g., for the transmission and reception of system level messages 208 and application level messages 209).

Software and/or firmware executing within controller 200 may include support for device discovery protocols 210, which allow the controller and the controlled devices to detect each other and establish communications with system level (or discovery level) messages 208. The device discovery process results in the building of a device list 212 containing operational information for each controlled device detected. Such information may include, for example, one or more of the following:

Device ID—a value uniquely identifying the controlled device (e.g., a UUID or MAC address)

Device Type ID—a value corresponding to a recognized class of controlled devices Driver ID—a value corresponding to a particular device driver Device Encryption Key Controller 200 may also include control application software 214 for implementing the control system based on the capabilities of each controlled device and one or more control rules governing the behavior of the system. Control application 214 receives control feedback from and issues control instructions to the controlled devices through their respective device drivers 216. Device driver 216 converts the control instructions into a data and instruction format the respective controlled device will understand, as well as converting any feedback information into data variables the control application can use.

An encryption module (ENC/DEC) 219 provides for encryption of outgoing messages (e.g., using device key 217) and decryption of incoming messages, if the security mode of the controlled device so requires.

Controlled device 201 is shown with I/O circuit 202B, execution circuit (PROC/MEM) 203B and transceiver circuit 204B. I/O circuit 207 provides the interface to the appliance being controlled. Though shown with a processor and memory, the execution circuit 203B may be implemented in other ways without departing from the scope of the invention. For example, execution circuit 203B may comprise a state machine with hardwired instruction sequences.

The functions within controlled device 201 include system level device discovery functions 211, which may include passing a driver ID 213 identifying the preferred driver for the controlled device. Appliance control functions 215 receive the application messages 209 from the controller 200, and implement the desired behavior (e.g., by asserting/de-asserting certain appliance control signals on port 207 and/or reading sensor inputs on port 207.

Depending on the current security mode 221 of the controlled device 201, an encryption module 220 may operate to encrypt and decrypt outbound and inbound application level messages, respectively. Decryption entails applying the device's own encryption key, whereas encryption entails using the controller's key 218. Any encryption scheme may be used within the scope of the invention, though the initial key exchange may differ in accordance with the security mode of the controlled device.

During device discovery, controller 200 and controlled device 201 may use a manually-entered (with respect to the controller) external key 223 or a pre-determined global key (not shown) to encrypt and exchange respective encryption keys for use in application level messaging.

In some embodiments, to prevent remote reconfiguration of the security mode 221, the security mode parameter may be implemented with a manually configurable hardware element 222 (e.g., a multi-state switch, a dial, a selective jumper connection, a push-button, etc.) on the body of the controlled device 201. The current value of the security mode parameter 221 is used inside controlled device 201 as a control signal with respect to handling of application level messages and with respect to selecting which initial key is being utilized for the encrypted key exchange during discovery.

Security Mode with Manual Key

In some embodiments, one security mode (herein referred to as mode "2" for convenience) dictates that an externally visible and network-inaccessible key 223 be used to encrypt an initial key exchange. The security mode may require that key 223 be manually entered into the controller 200 (e.g., through a user interface (UI) or I/O port of controller 200 or through a UI of a personal computer coupled to controller 200 over port 205).

Key 223 may be presented on the housing of controlled device 201, such that a user/administrator can visually obtain the key for entry into the controller. The key may also be provided on the packaging within which the controlled device is sold, within the paper manuals included in the package or on a sticker, card, or CD that the user obtains from the controlled device packaging. The form of the key may be visually readable (e.g., plain text), or computer readable (e.g., on a magnetic strip, a support CD, a barcode, etc.). Further, the key value is available to the encryption module of controlled device 201, but is preferably not otherwise accessible via software means.

In a further embodiment, the controlled device may have a random or pseudo-random key generator from which a new key value 223 may be generated (e.g., by a manual trigger) and visually read (e.g., from a small LED display located on or in the controlled device). Such a key may be valid for a predetermined time period from the time of key generation (though a current key value may be rendered obsolete by the triggered generation of a new key value), and may be inaccessible from the network via software means. Preferably, only a person with direct access to the controlled device would be able to obtain the key 223. Thus, wireless interlopers would be precluded from obtaining key 223.

Security Mode with Global Key

In one or more embodiments, a further security mode (herein referred to as mode "1" for convenience) entails that the initial encryption key exchange between controller 200 and controlled device 201 be performed using a predetermined, global encryption key (not shown). This security mode is more convenient than mode 2, because the user/admin need not perform any manual key entries. However, mode 1 allows for a moment of some vulnerability during the key exchange, when an interloper with a hacked (or otherwise improperly obtained) global key might be able to intercept the key exchange messages and thereby obtain the respective keys of the controller and controlled device. However, this moment of slight vulnerability during device discovery is brief, and the subsequent encryption provides the wireless control system with protection from most prospective interlopers.

In an alternate embodiment of mode "1", or as an additional mode, the initial encryption key exchange may be executed without the use of a global key (i.e., the key exchange may be performed without the protection of keyed encryption). However, once the key exchange is completed, application level communications are secured using the exchanged encryption keys.

Security Mode without Encryption

In one or more embodiments, the controlled device may have a further security mode (herein referred to as mode "0" for convenience) in which no encryption is used for application level messages. Controlled devices that control or monitor low-risk appliances, such as a hallway light, may use mode 0 with little concern of extensive consequences from such control being compromised. In most cases, a user/administrator will take advantage of the increased security of encrypted communication under mode 1 or 2 for high-risk appliances, such as alarm and security systems.

Embodiment of Device Discovery Process—the Controller

Figure 3:
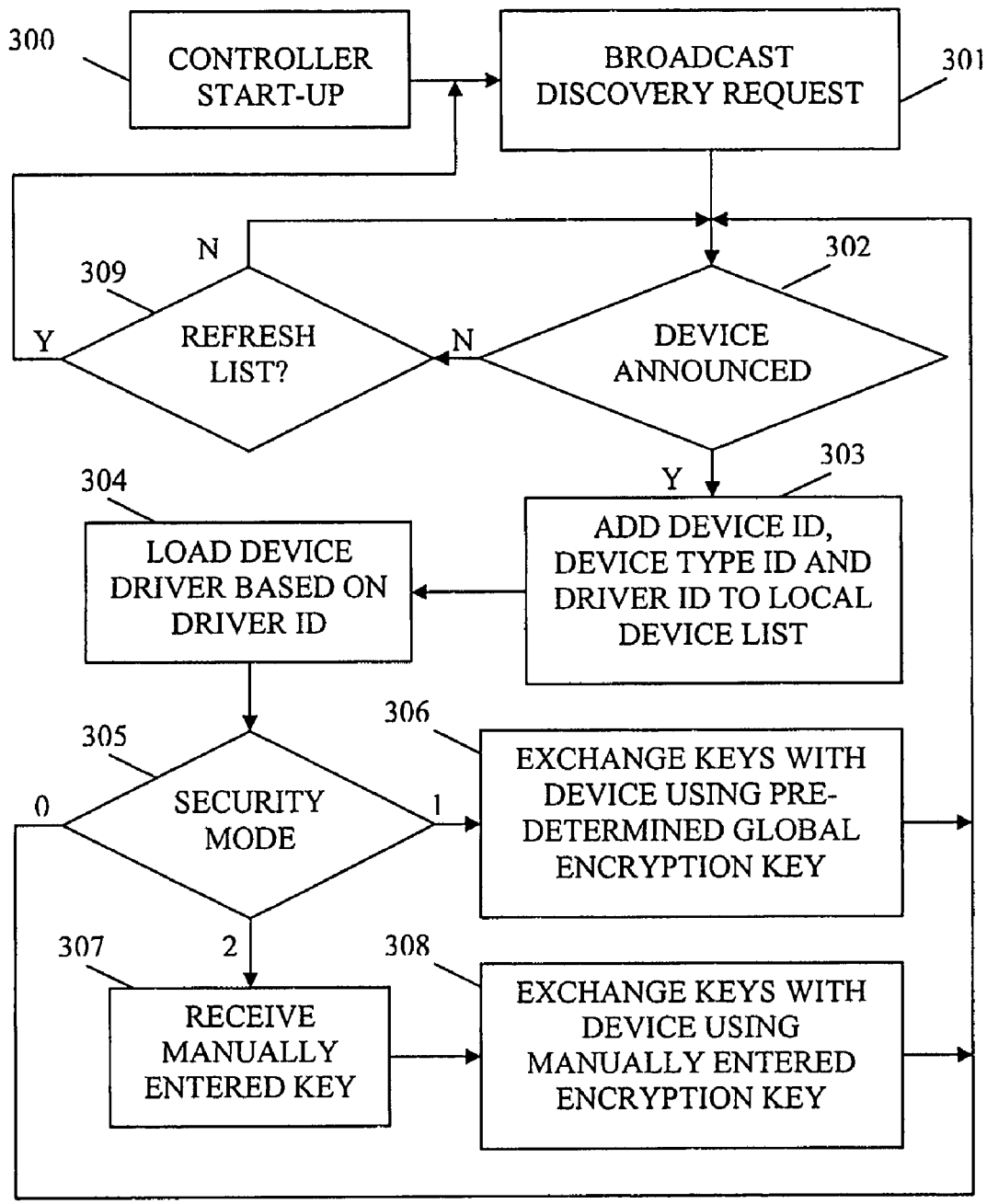
FIG. 3 is a flow diagram of a device discovery method for a controller, in accordance with one or more embodiments of the invention.

FIG. 3 is a flow diagram of a device discovery process for a controller, in accordance with one or more embodiments of the invention. Block 300 begins the start-up process of the controller. In block 301, the controller initiates device discovery by broadcasting a discovery request (e.g., requesting that all controlled devices in signaling range announce their presence). In block 302, if one or more controlled devices have sent responses announcing their presence, then the controller communicates with one of the responding devices in block 303, obtaining and recording device information, such as a device ID a device type ID and a device driver ID. In one or more embodiments, when the controller is already aware of one or more specific "known" controlled devices (e.g., known from a prior device discovery broadcast session), the controller may choose to ignore presence announcements received from those known controlled devices.

In block 304, the controller loads a device driver based on the device driver ID sent by the controlled device. Alternatively, the controller may wait to load the device driver until after the controller's control application selects the controlled device for inclusion in a control algorithm or process (e.g., when the device driver is needed to facilitate application level messaging to the controlled device).

Because the controlled device specifies a preferred device driver ID, the controller is able to locate a suitable device driver with less computational effort than systems of the prior art, and with greater assurance that the full control functionality of the controlled device will be realized.

In some embodiments, if the controller has a lower version of the device driver (or no corresponding driver at all), the controller may be configured to recognize that a driver update will provide better performance. A configurable parameter within the controller may be implemented to determine whether the controller attempts to obtain a driver update automatically, uses the current driver on hand and/or provides an alert indicator to the user/administrator.

Likewise, in some embodiments, if the controller has a corresponding device driver with a higher version than that indicated by the controlled device, based on another configurable parameter, the controller may implement a firmware upgrade of the controlled device (e.g., using the lower driver version initially and then changing to the higher version after the firmware upgrade) and/or alert the user/administrator, use the lower version of the driver (if available), or use the higher version of the driver (e.g., if the driver itself indicates backward compatibility).

Referring again to FIG. 3, the process branches in block 305 based upon the security mode of the controlled device. The controller may be aware of the security mode explicitly, by the provision of a mode identifier from the controlled device, or implicitly, by the controlled device's initiation or request of certain actions (e.g., key exchange using manual key) that indicate the security mode.

In the illustrated embodiment, if the security mode is "0", then no encryption will be used (and no key exchange is requested by the controlled device), and the controller returns to block 302 to process any further device presence announcements. If the security mode is "1", the controller exchanges encryption keys with the controlled device in block 306, using a predetermined global key to encrypt the exchange. If the security mode is "2", the controller receives a manually entered key in block 307, and uses that manual key to perform an encrypted key exchange with the controlled device in block 308. Alternate or additional security modes may be implemented in other embodiments without departing from the scope of the invention.

After either of blocks 306 and 308, the controller and controlled device are enabled for application level messaging. The controller thus returns to step 302 to process any further device presence announcements. If no further devices have issued presence announcements, then the controller proceeds to block 309, where, if the controller has been prompted to refresh the local device list (e.g., by a user/administrator command or a time-based refresh command), the controller initiates another discovery request at block 301. If the controller is not prompted to refresh the local device list, then the controller returns to block 302.

The loop comprising blocks 302 and 309 operates to catch any refresh commands initiated by the controller, as well as any independently triggered device presence announcements that occur after controller start-up (e.g., in some embodiments, controlled devices may be configured to broadcast presence announcements on start-up to facilitate immediate detection and integration into the control network).

Embodiment of Device Discovery Process—the Controlled Device

Figure 4:
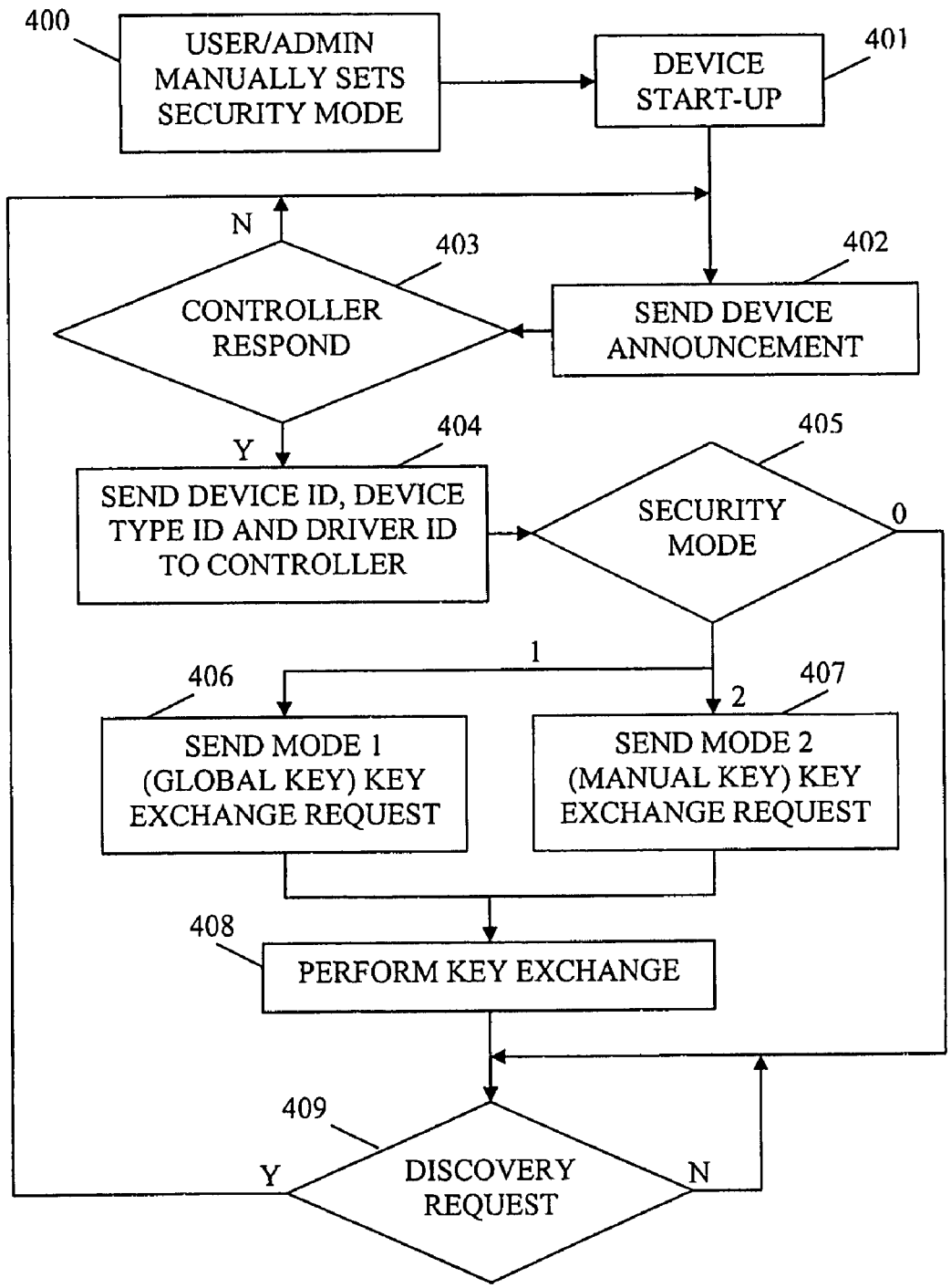
FIG. 4 is a flow diagram of a device discovery method for a controlled device, in accordance with one or more embodiments of the invention.

FIG. 4 is a flow diagram of a device discovery process for a controlled device, in accordance with an embodiment of the invention. In block 400, the user/administrator manually sets the security mode of the controlled device. The controlled device may be pre-set to a default security mode (e.g., enhanced security mode "3") that will control if block 400 is not performed. In block 401, the controlled device begins its start-up routine, e.g., upon application of power to the device. In step 402, the controlled device sends a device presence announcement. This presence announcement may be broadcast when initiated unilaterally, and unicast (i.e., directed) to a specific controller (e.g., message specifies controller ID) when initiated in response to a controller's discovery request.

In block 403, if no controller responds to the presence announcement, then the controlled device returns to block 402 to send presence announcements at intervals until a controller does respond in block 403. In response to a controller's presence acknowledgment message, in block 404, the controlled device sends a message with device information, such as a device ID, a device type ID and a driver ID.

The discovery process of the controlled device branches at block 405 based on the device's security mode. In the illustrated embodiment, if the security mode is "0", then no further discovery action is necessary (the controller and the controlled device are ready for unencrypted application level communication), and the process goes to block 409.

If the security mode is "1", then in block 406, the controlled device sends a message to the controller requesting a key exchange using the global key; whereas, if the security mode is "2", then in block 407, the controlled device sends a message to the controller requesting a key exchange using the manual key (223). In block 408, the controlled device performs the encrypted key exchange with the controller, enabling secured application-level communication between the controller and the controlled device. No further discovery activities need be undertaken by the controlled device, unless, at block 409, the controlled device receives a discovery request from the controller (e.g., to refresh its local device list), in which case the controlled device returns to block 402.

In one or more embodiments, the controller and the controlled device may intermittently or periodically exchange new keys to enhance security. The new key exchange may be performed using the current keys or the global/manual keys. A refresh of the local device list at the controller may be used as an occasion to establish new keys for each controlled device. Alternatively, the controller may be configured to omit the key exchange process with controlled devices for which the controller already holds an encryption key.

Embodiment of Controlled Device Communication Process

Figure 5:
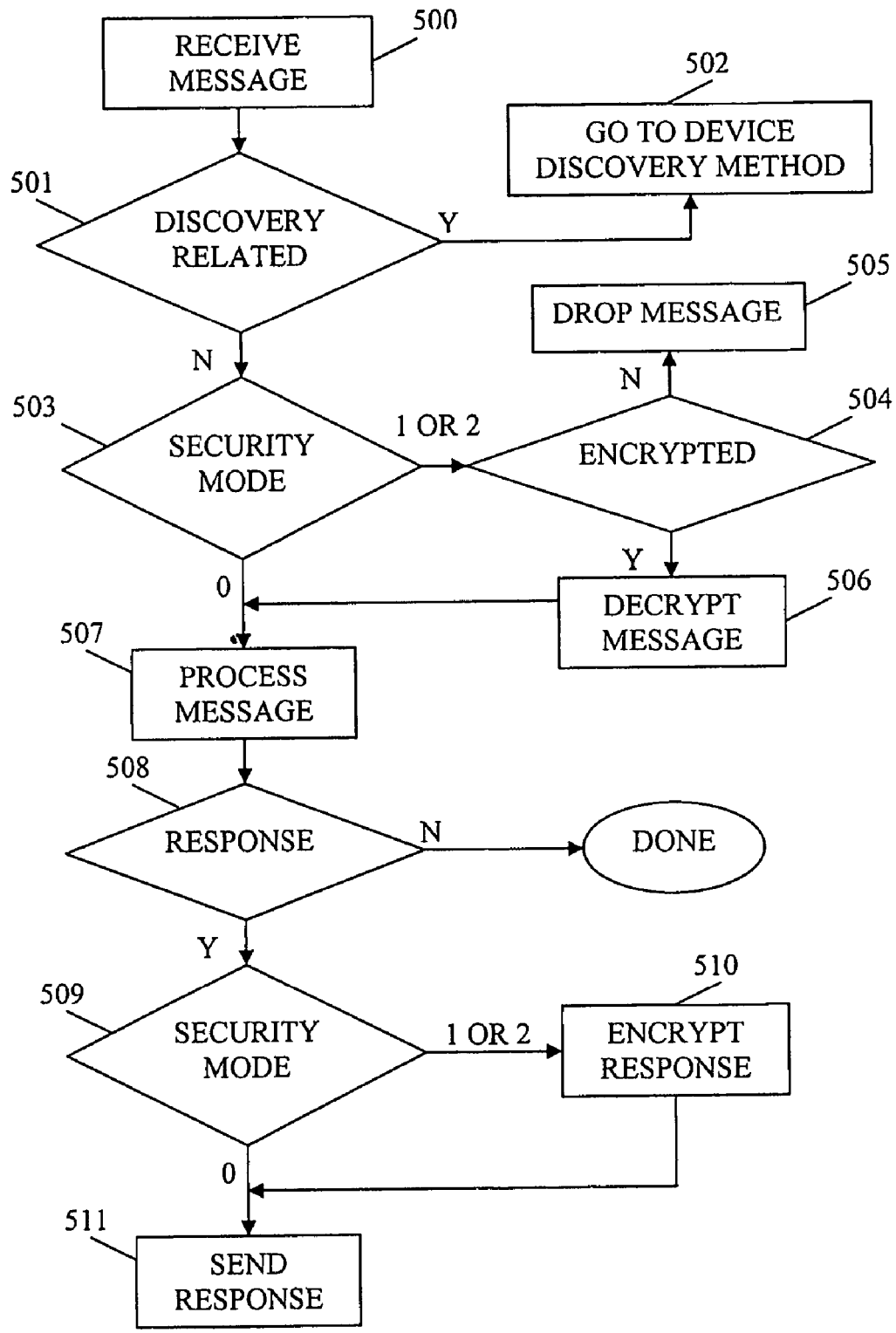
FIG. 5 is a flow diagram of a communication process of a controlled device in accordance with one or more embodiments of the invention.

FIG. 5 is a flow diagram of a communication process of a controlled device in accordance with one or more embodiments of the invention. In block 500, the controlled device receives a message. In block 501, if the message is discovery related, then the controlled device reverts, in block 502, to a device discovery process (e.g., as illustrated in FIG. 4). If the message is not discovery related, then the controlled device branches at block 503, based on the current security mode.

In the illustrated embodiment, if the security mode is "0", then the controlled device foregoes encryption measures and processes the message at block 507. However, if the security mode is "1" or "2", then the controlled device determines whether the message is encrypted in block 504. If the message is not encrypted, then the controlled device drops the message in block 505. If the message is encrypted, then the controlled device decrypts the message in block 506 and processes the decrypted message in block 507.

If, in block 508, the message requires no response, then the communication process with respect to the current message is completed. However, if the controlled device does have a response message for the controller, the controlled device branches at step 509, based on the current security mode. If the security mode is "0", the response message is sent unencrypted in block 511; whereas, if the security mode is "1" or "2", then the controlled device encrypts the response message in block 510, before transmitting the message in block 511.

System Communication with Multi-Mode Security

Figure 6A:
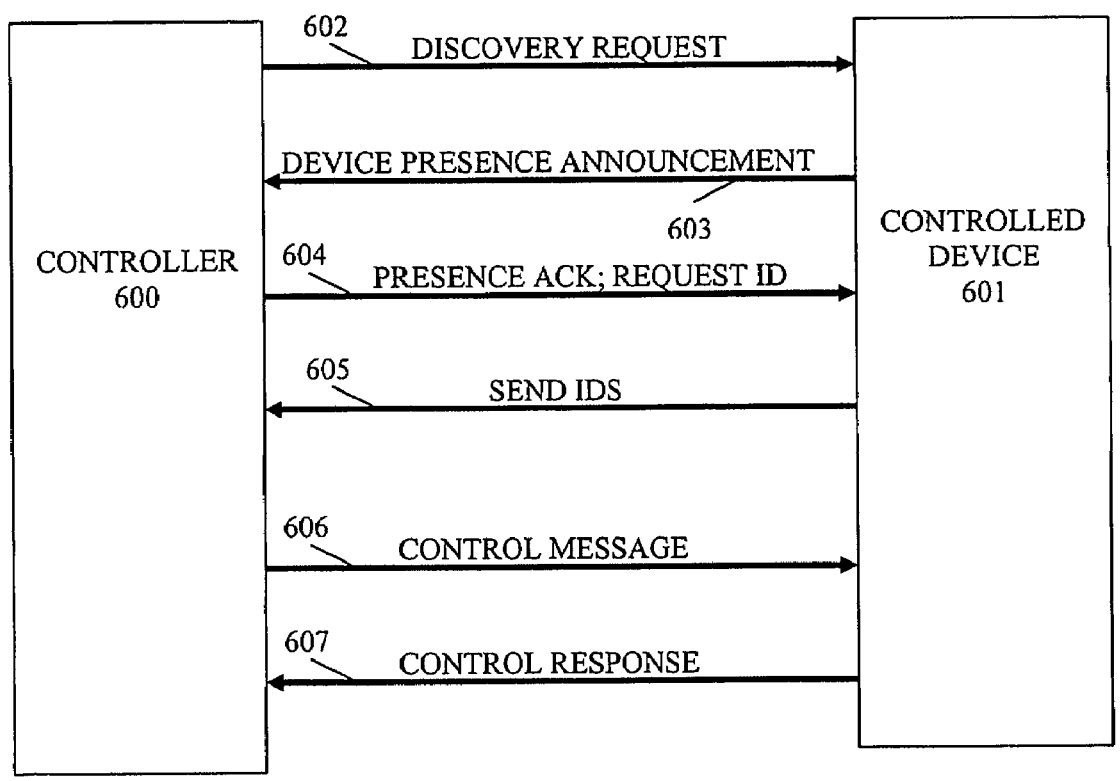
FIG. 6A is a block diagram illustrating communication between a controller and a controlled device in an unsecured mode, in accordance with one or more embodiments of the invention.
Figure 6B:
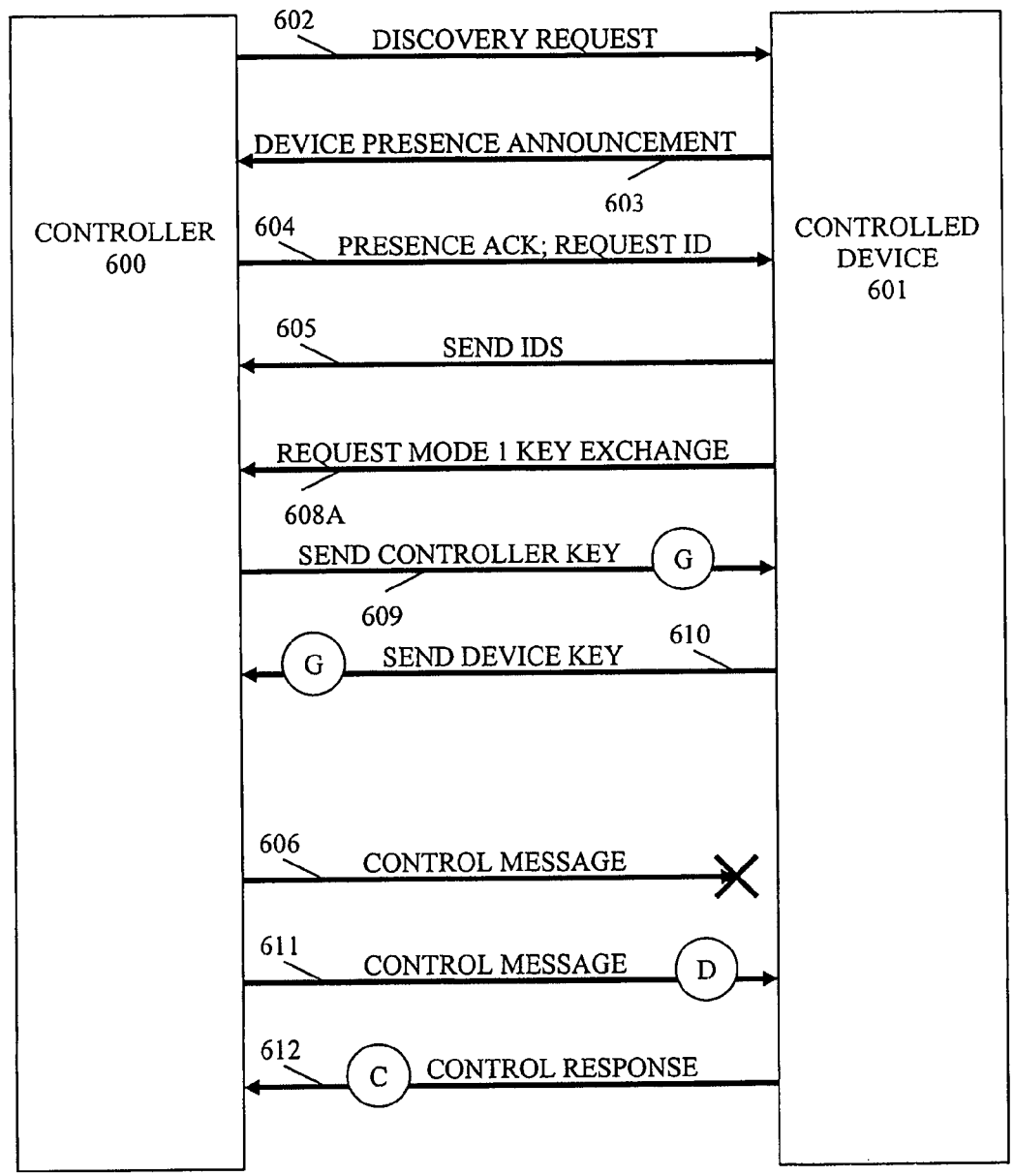
FIG. 6B is a block diagram illustrating communication between a controller and a controlled device in a first secured mode, in accordance with one or more embodiments of the invention.
Figure 6C:
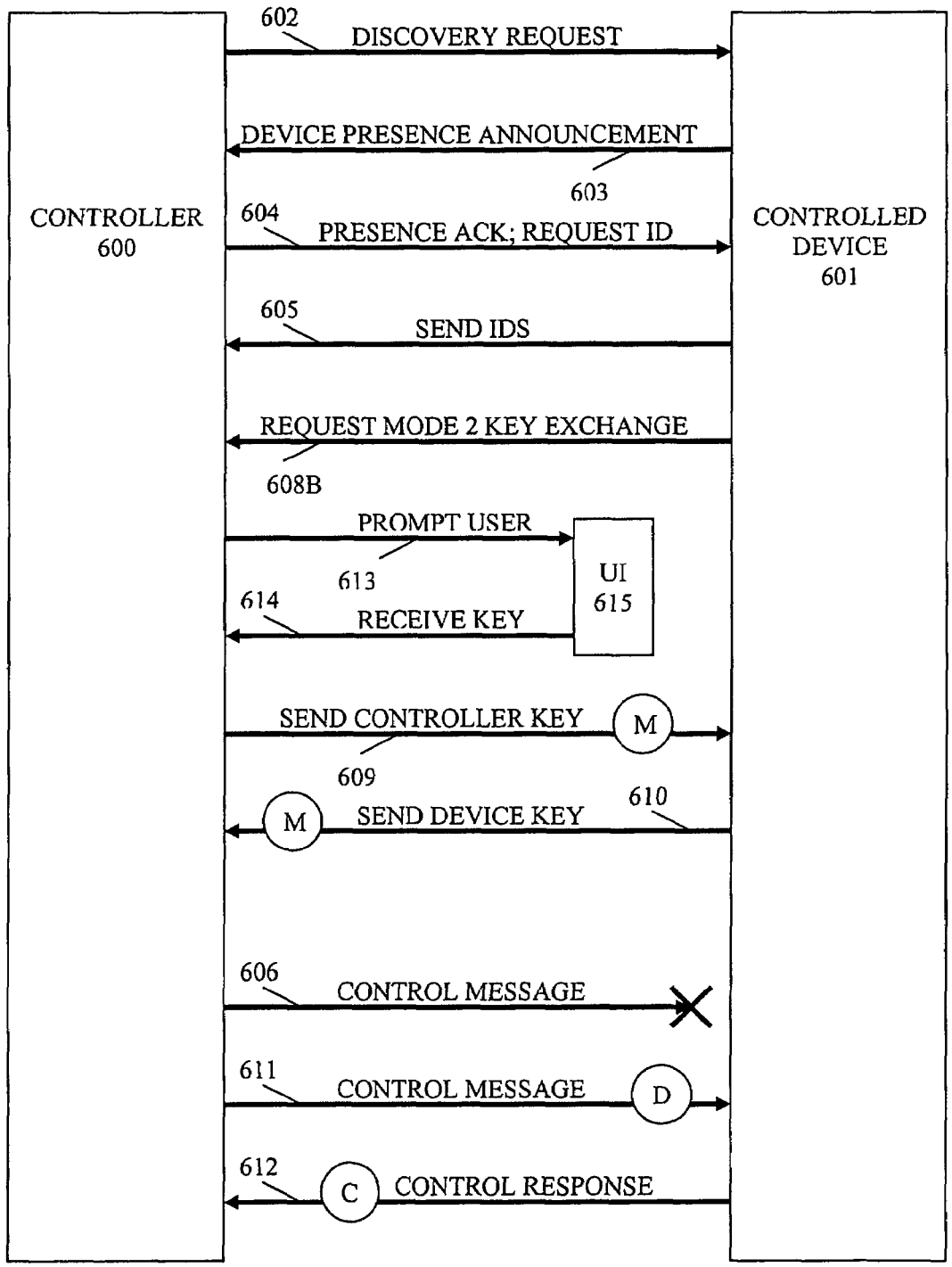
FIG. 6C is a block diagram illustrating communication between a controller and a controlled device in a second secured mode, in accordance with one or more embodiments of the invention.

FIGS. 6A-6C are block diagrams illustrating a message sequence under three different security modes, respectively, in accordance with one or more embodiments of the invention. FIGS. 6A-6C are illustrative only. It will be understood that other embodiments may use more or fewer messages to communicate the corresponding information, without departing from the scope of the invention. For example, other embodiments may implement more complicated hand-shaking protocols, necessitating a greater number of messages exchanges between the controller and the controlled device.

FIG. 6A represents a communication sequence in the context of security mode "0" (i.e., no encryption). Controller 600 initiates discovery request message 602, eliciting device presence announcement message 603 from controlled device 601. Controller 600 then sends a message 604 acknowledging the presence announcement and requesting device information. Controlled device 601 responds with message 605, including the requested device information (e.g., device ID, device type ID, driver ID, etc.). With messages 602-605 satisfying the device discovery process under mode "0", the controller 600 is able to send unencrypted control (i.e., application level) messages 606 to controlled device 601, and controlled device 601 is able to send unencrypted control messages 607 back to controller 600.

FIG. 6B represents a communication sequence in the context of security mode "1" (i.e., encryption with global key-based exchange). Controller 600 initiates discovery request message 602, eliciting device presence announcement message 603 from controlled device 601. Controller 600 then sends a message 604 acknowledging the presence announcement and requesting device information. Controlled device 601 responds with message 605, including the requested device information (e.g., device ID, device type ID, driver ID, etc.).

To implement the secured aspect of mode "1", controlled device 601 also sends message 608A, requesting a key exchange secured with encryption using the predetermined global key. Controller 600 sends message 609, encrypted with the global key and including the controller's encryption key. Likewise, controlled device 601 sends message 610, encrypted with the global key (or alternatively, the controller's key) and including the controlled device's encryption key.

With the mode "1" discovery process completed by messages 602-605, 608A, 609 and 610, the controller is able to send secured control message 611, encrypted with the controlled device's key, and the controlled device is able to send secured message 612, encrypted with the controller's key. Unencrypted control messages, such as message 606, are dropped by controlled device 601.

FIG. 6C represents a communication sequence in the context of security mode "2" (i.e., encryption with manual key-based exchange). As in the other modes, controller 600 initiates discovery request message 602, eliciting device presence announcement message 603 from controlled device 601. Controller 600 then sends a message 604 acknowledging the presence announcement and requesting device information. Controlled device 601 responds with message 605, including the requested device information (e.g., device ID, device type ID, driver ID, etc.).

To implement the secured aspect of mode "2", controlled device 601 sends message 608B, requesting a key exchange secured with encryption using the manually obtained key associated with controlled device 601. In this embodiment, controller 600 may send a user prompt to user interface 615 to notify the user/administrator that it is waiting for the key to be manually entered. Controller 600 then receives the manually entered key (614) from interface 615. (Note that the controller may be configured to process discovery and control messages for other controlled devices while waiting for key 223 to be manually entered.) Once in possession of key 223, controller 600 sends message 609, encrypted with manually entered key 223 and including the controller's encryption key. Likewise, controlled device 601 sends message 610, encrypted with key 223 (or alternatively, the controller's key) and including the controlled device's encryption key. In another embodiment, controller 600 may continue to use key 223 as the controlled device's encryption key, in which case, message 610 may be omitted.

With the mode "2" discovery process completed by messages 602-605, 608B, 609-610, 613 and 614, the controller is able to send secured control message 611, encrypted with the controlled device's key, and the controlled device is able to send secured message 612, encrypted with the controller's key. As in mode "1", unencrypted control messages, such as message 606, are dropped by controlled device 601.

Thus, a method and apparatus for device detection and multi-mode security in a wired and/or wireless control network have been described. Particular embodiments described herein are illustrative only and should not limit the present invention thereby. The invention is defined by the claims and their full scope of equivalents.

The claimed invention is:

1. A control network comprising: a controller; and
   a controlled device, wherein said controlled device has a first level of operation and a second level of operation, and wherein said controlled device is configurable to operate in one of a plurality of security modes;
   said plurality of security modes comprising: a first security mode wherein said second level of operation is always enabled;
   a second security mode wherein said second level of operation is disabled until said controller and said controlled device perform an encryption key exchange using a predetermined encryption key;
   and a third security mode wherein said second level of operation is disabled until said controller initiates encrypted communication using a manually entered encryption key;
   wherein, in said second security mode and said third security mode, said controlled device is configured to drop encrypted application level messages; and
   wherein said controlled device comprises a viewable surface comprising a text string from which said manually entered encryption key may be obtained.

2. The control network of claim 1, wherein said control network comprises a wireless network.

3. The control network of claim 1, wherein said first level of operation comprises one or more discovery functions.

4. The control network of claim 3, wherein said one or more discovery functions comprise a function configured to transmit a message to said controller, said message comprising a field indicating a preferred device driver associated with said controlled device.

5. The control network of claim 1, wherein said second level of operation comprises one or more application level functions.

6. The control network of claim 1, wherein said first level of operation is independent of said plurality of security modes.

7. The control network of claim 1, wherein said controlled device is hardware configurable to operate in one of said plurality of security modes.

8. The control network of claim 1, wherein said controlled device comprises a physical surface comprising computer readable indicia from which said manually entered encryption key may be obtained.

9. The control network of claim 8, wherein said surface comprises a housing of said controlled device.

10. The control network of claim 8, wherein said surface comprises a key card.

11. The control network of claim 8, wherein said computer readable indicia comprises a bar code.

12. The control network of claim 11, wherein said controller comprises a bar code reader.

13. The control network of claim 8, wherein said computer readable indicia comprises a magnetic stripe.

14. The control network of claim 13, wherein said controller comprises a magnetic stripe reader.

15. A controlled device for use in a control network comprising a controller, wherein said controlled device has a first level of operation and a second level of operation, and wherein said controlled device is configurable to operate in one of a plurality of security modes, said plurality of security modes comprising: a first security mode wherein said second level of operation is always enabled;
    a second security mode wherein said second level of operation is disabled until said controlled device performs an encryption key exchange with said controller using a predetermined encryption key;
    and a third security mode wherein said second level of operation is disabled until said controlled device receives an encrypted communication from said controller using a manually entered encryption key;
    wherein said controlled device comprises a viewable surface comprising a text string from which said manually entered encryption key may be obtained; and
    wherein said controlled device comprises a physical surface comprising computer readable indicia from which said manually entered encryption key may be obtained.

16. The controlled device of claim 15, wherein said controlled device is configured to communicate over a wireless network.

17. The controlled device of claim 15, wherein said first level of operation comprises one or more discovery functions.

18. The controlled device of claim 17, wherein said one or more discovery functions comprises a function configured to transmit a message to said controller, said message comprising a field indicating a preferred device driver associated with said controlled device.

19. The controlled device of claim 15, wherein said second level of operation comprises one or more application level functions.

20. The controlled device of claim 15, wherein said first level of operation is independent of said plurality of security modes.

21. The controlled device of claim 15, wherein said controlled device is hardware configurable to operate in one of said plurality of security modes.

22. The controlled device of claim 15, wherein, in said second security mode and said third security mode, said controlled device is configured to drop unencrypted application level messages.

23. The controlled device of claim 15, wherein said surface comprises a housing of said controlled device.

24. The controlled device of claim 15, wherein said surface comprises a key card.

25. The controlled device of claim 15 wherein said computer readable indicia comprises a bar code.

26. The controlled device of claim 25, wherein said controller comprises a bar code reader.

27. The controlled device of claim 15, wherein said computer readable indicia comprises a magnetic stripe.

28. The controlled device of claim 27, wherein said controller comprises a magnetic stripe reader.

* * * * *